United States Patent [19]

Hwang

[11] Patent Number: 4,926,160

[45] Date of Patent: May 15, 1990

[54] MEANS FOR CONTROLLING POWER DOOR LOCKS WITH AN AUTOMOBILE BURGLAR ALARM

[76] Inventor: Shih-Ming Hwang, No. 11, Alley 12, Lane 7, Ching Tyan Street, Taipei, Taiwan

[21] Appl. No.: 231,264

[22] Filed: Aug. 12, 1988

[51] Int. Cl.$^5$ ............................................. B60R 25/00
[52] U.S. Cl. ..................................... 340/426; 307/10.2
[58] Field of Search ................ 340/426, 430; 307/10.2

[56] References Cited

U.S. PATENT DOCUMENTS 4,035,791  7/1977  Katayama ........................... 340/426
4,811,013  3/1989  Akutsu ................................. 307/10.2

Primary Examiner—Joseph A. Orsino
Assistant Examiner—Frank M. Scutch, III
Attorney, Agent, or Firm—Lowe, Price, LeBlanc, Becker & Shur

[57] ABSTRACT

A device which automatically locks a car's doors when said car's burglar alarm is armed, and automatically unlocks said doors when alarm is disarmed, and furthermore automatically relocks said doors should they be unlocked accidentally. Said doors can also be locked or unlocked via a manual override switch independent of whether the alarm is armed or disarmed.

5 Claims, 2 Drawing Sheets

MEANS FOR CONTROLLING POWER DOOR LOCKS WITH AN AUTOMOBILE BURGLAR ALARM

BACKGROUND OF THE INVENTION

In general, an automobile burglar alarm is designed to deter attempts of unauthorized entry into or vandalism to an automobile, and to alert the car's owner and/or passers-by of such attempts on the car. Yet if the owner does not remember to lock the car's doors, a would-be thief or vandal may be more able to by-pass the car's burglar alarm.

In view of the above defect, the inventor has invented a device which works in conjunction with an automobile burglar alarm to ensure that the car's doors are locked when the alarm is armed. The invention can lock and unlock the car's doors in one of two ways: either automatically when the alarm arms and disarms, or manually via an external switch. Said invention offers two benefits to automobile burglar alarm owners: the convenience of locking and unlocking the car's doors from inside or outside the vehicle, and the security of knowing that when the automobile burglar alarm is armed the car's doors are locked.

SUMMARY OF THE INVENTION

The present invention provides automatic locking or unlocking of a car's power door lock system, either in conjunction with the arming and disarming of an automobile burglar alarm, or via some other external switch. In the first case, when the automobile burglar alarm is armed, a signal is transmitted via the present invention to lock the car's doors. When the automobile burglar alarm is disarmed, a signal is transmitted via the present invention to unlock the car's doors. In the second case, the car's owner can override the automobile burglar alarm via another switch to lock or unlock the car's doors at will. In either case, the present invention will generate a lock or unlock signal of the appropriate length necessary to lock or unlock the car's doors. Note that the length of the lock and unlock signal is programmable according to the type of door lock system in a particular automobile.

DETAILED DESCRIPTION OF THE PREFERRED EMBODIMENT

The automatic door lock and unlock control means of the present invention is characterized by: a monitor circuit connected to an automobile burglar alarm to monitor whether the car's doors are open or closed, a switch control circuit to convert the alarm armed or disarmed signal from the automobile burglar alarm to the appropriate door lock or unlock signal; and a means of allowing the car's owner to manually override the alarm's arm or disarm signal to lock or unlock the car's doors at whenever needed.

Figure 1:
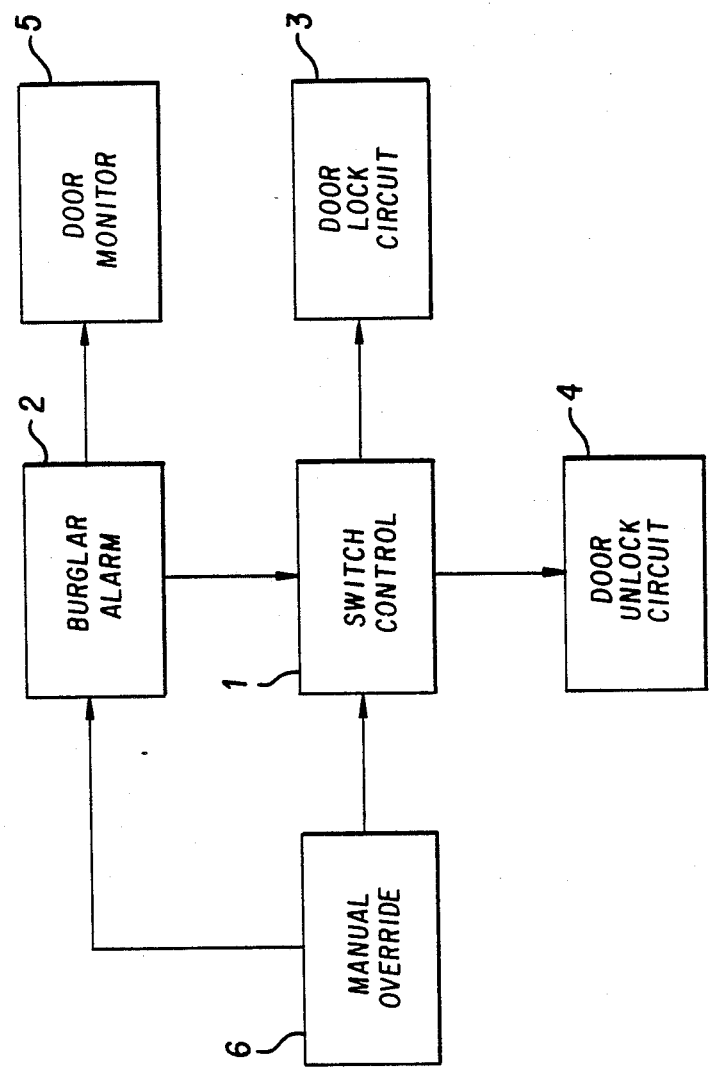
FIG. 1 is a block diagram of the present invention.

The present invention is described below with reference to the attached drawings. As shown in FIG. 1, a block diagram of a preferred embodiment according to the present invention, the switch control circuit (1) can accept a door lock or unlock signal from one of two separate inputs.

In the first case, when the automotive burglar alarm is armed or disarmed, the appropriate lock or unlock signal is sent from the automotive burglar alarm (2) to the switch control circuit (1). If the signal is a lock signal, it is passed to the door lock circuit (3), which then activates door actuators (7) to lock the car's doors. If the signal is an unlock signal, it is passed to the door unlock circuit (4), which then activates door actuators (7) to unlock the car's doors. After the doors unlock, the unlock signal is held within the door monitor circuit (5) for a predetermined delay period. If a car door is not opened within said delay period, an unlock signal will be passed from the door monitor circuit (5) via the automotive burglar alarm (2) and the door lock circuit (3) to the door actuators (7), thereby relocking the doors. In this way, the car's doors cannot be permanently unlocked because of either accidental or malicious outside interference which would cause the automotive burglar alarm to disarm.

In the second case, the car's owner transmits a signal from some external switch via the manual override circuit (6). This external switch may be a pushbutton, remote control, digital keypad code, or some other switch, or more than one of such switches, and is not a point for which a patent is sought. The signal is sent to the switch control circuit (1). The switch control circuit (1) then passes either a lock signal via the door lock circuit (3) to the door actuators (7) to lock the doors, or an unlock signal via the door unlock circuit (4) to the door actuators (7) to unlock the doors as in the first case above. The signal sent depends on whether the car's doors most recently were locked or unlocked via the present invention. If the doors were most recently locked, the switch control circuit (1) will pass an unlock signal. If the doors were most recently unlocked, a lock signal will be passed. Note that said external switch (6) will operate the door locks as described above regardless of whether any car door is open or not.

DETAILED DESCRIPTION OF THE CIRCUIT DIAGRAM

Figure 2:
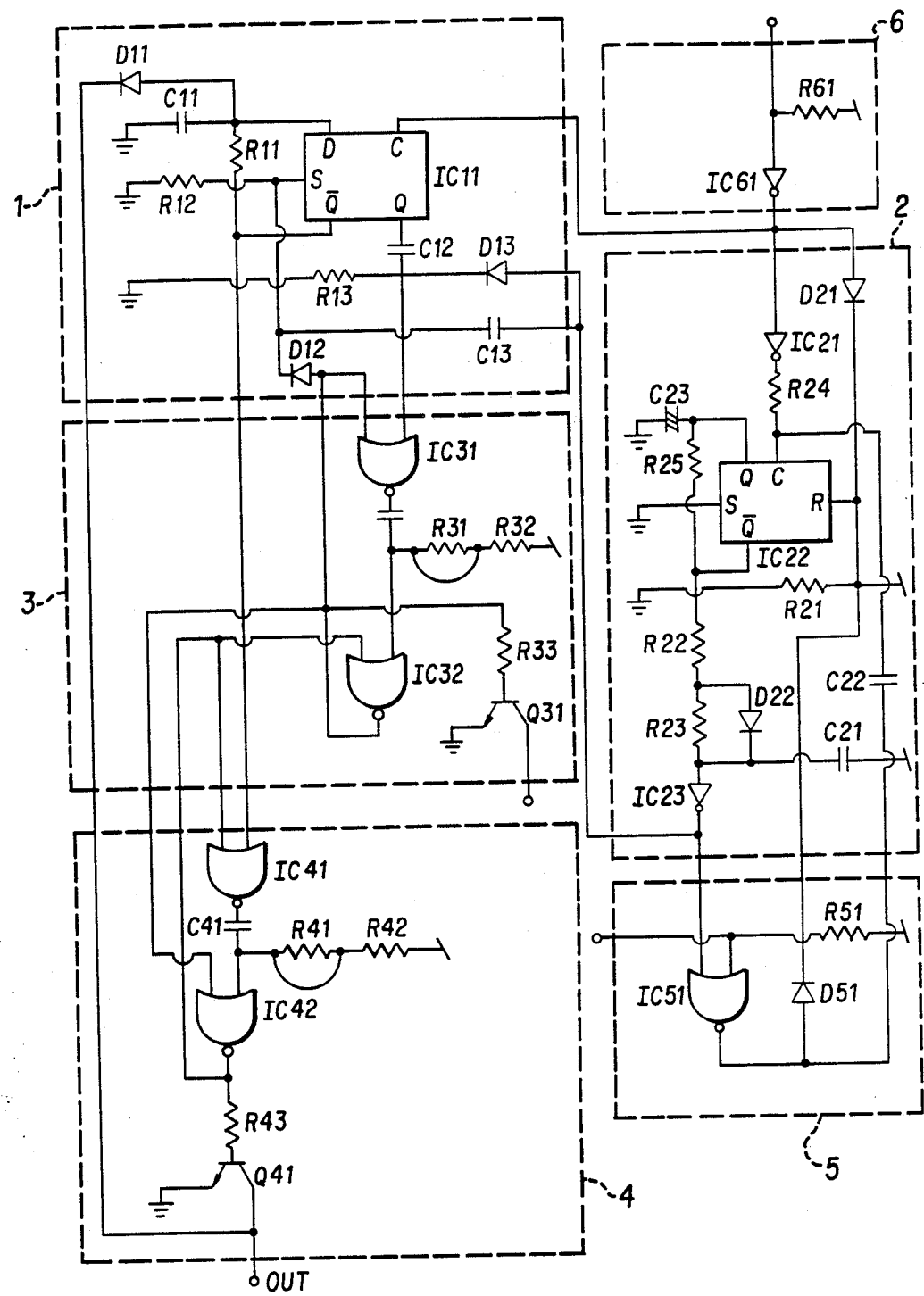
FIG. 2 is circuit diagram of a preferred embodiment according to the present invention.

FIG. 2 is the control circuit diagram of a preferred embodiment according to the present invention. As will be shown below, when the car's alarm is armed, the car's doors will lock automatically. At that time, output Q of IC11 will become "HI," and output Q-bar will become "LO" which is the normal state of IC11 when the last operation of the present invention was to lock the doors. Should the last operation of the present invention be to unlock the car's doors, output Q and output Q-bar of IC11 will reverse states to indicate this. With this understanding, we can examine said circuit diagram.

A, when the alarm is armed

As shown in the circuit diagram, when input R of IC22 is "HI" then output Q-bar of IC22 is "HI." Input R is "HI" in one of two situations. First, when the car's ignition key is turned on, input R of IC22 is "HI." Second, when any car door is opened, IC51 sends a "HI" via D51 to input R of IC22. If all the car's doors are closed while the ignition key is turned off, IC51 sends a "LO" via C22 and R24 to input C of IC22, and input R of IC22 is no longer "HI," and so output Q-bar of IC22 becomes "LO." Note that "door" as used in this discussion may include any opening in the car, including all doors, the hood, and the trunk, depending on how the alarm is installed.

When output Q-bar of IC22 is "HI," such as when the car's ignition is off or a car door is opened, the car's alarm will not arm and the car's power door locks will not lock. However, when output Q-bar of IC22 is "LO," a signal is sent to an exit delay timer consisting of R22, R23, D22 and C21. This timer determines the alarm's exit delay period. During this time period, the car's owner may interrupt the car's alarm's arming and doors' locking if desired by opening the car's door, which, as shown above, causes output Q-bar of IC22 to become "HI." When the time determined by said timer expires, a "HI" signal from IC23 is sent via C13 and R12 to IC11. If the output Q of IC11 is "LO" and output Q-bar of IC11 "HI," then the signal from IC23 causes the outputs Q and Q-bar of IC11 to reverse. The "HI" from output Q of IC11 is sent via C12 and R13 to IC31. IC31 then outputs a "LO" signal to a door lock timer circuit consisting of C31, R31, R32. This signal is sent via R33 to Q31 for said timer's pre-set time, which causes the car's doors to lock. Note that the pre-set time of said door lock timer can be adjusted as needed according to the needs of the car's door lock actuators. In this case, the output Q from IC11 remains "HI" while the output Q-bar remains "LO" to indicate that the present invention caused the car's doors to lock.

On the other hand, when the car's ignition key is turned off and a car door is opened and closed, if the output Q of IC11 is already "HI" and output Q-bar of IC11 is already "LO" this indicates that the car's door should already locked. This may be because the driver locked the car's doors via the manual override (discussed below) from inside the car, then unlocked his or her door to exit the car. In this case, when the door is opened and closed, thereby causing output Q-bar of IC22 to become "HI," and after the exit delay time as determined by said exit delay timer has expired, the "HI" signal from IC23 passes via D13 directly to IC31, IC31 then outputs a "LO" signal via said door lock timer and R33 to Q31 for said door lock timer's pre-set time, which causes the car's doors to lock again. In this fashion, the car's doors will always lock when the car's alarm is armed.

While the door lock timer circuit consisting of C31 R31 and R32 is counting the door lock time, IC31 is also passing a "LO" signal to IC32. IC32 then passes a "HI" signal to input S of IC11. While input S of IC11 is "HI," input C of IC11 will not receive a lock or unlock signal from the car's alarm. This allows the car's doors to lock completely before the alarm attempts to lock or unlock them again, thus preventing excess wear on the door lock actuators. But after said door lock timer circuit is finished counting and IC31 is finished outputting the lock signal, IC11 can receive a lock or unlock signal from the car's alarm.

B. when the alarm is disarmed

To disarm the car's alarm and unlock the car's doors, a "LO" signal from some external switch passes via R61 to IC61, which is then converted to a "HI" signal which is passed directly to input C of IC11. Output Q of IC11 changes from "HI" to "LO" and output Q-bar of IC11 changes from "LO" to "HI." The "HI" from output Q-bar of IC11 is passed to IC41. IC41 then outputs a "LO" signal via a door unlock timer circuit consisting of C41, R41, and R42 and from there via R43 to Q41 for said timer's pre-set time, which causes the car's doors to unlock. Note that the pre-set time of said door unlock timer can be adjusted as needed according to the needs of the car's door lock actuators. In this case, the output Q-bar from IC11 remains "HI" and the output Q remains "LO" to indicate that the present invention cuased the car's doors to unlock.

At the same time the car's doors are unlocking, the "HI" from IC61 is also passed via IC21 and R24 to input C of IC22. This causes output Q-bar of IC22 to output a "LO" signal jto said exit delay timer. If no car door is opened, a "HI" will be sent from IC23 to IC11 to lock the car's doors as shown above (since the doors were just unlocked, output Q of IC11 is "LO" and output Q-bar is "HI," so the next operation will be to lock the doors). However, if a door is opened, output Q-bar of IC22 will become "HI" as shown above, which will stop the said exit delay timer, thus preventing the doors from being locked again. In this fashion, the car's doors will automatically relock themselves if unlocked accidentally.

While the door unlock timer circuit consisting of C41, R41 and R42 is counting the door lock time, IC41 is also passing a "LO" signal to IC42. IC42 then passes a "HI" signal to IC32, to disable the door lock time curciut. This allows the car's doors to unlock completely before the alarm attempts to lock or unlock them again, thus preventing excess wear on the door lock actuators. But after said door unlock timer circuit is finished counting and IC41 is finished outputting the unlock signal, IC11 can receive a lock or unlock signal from the car's alarm. C. manual override of the door lock/unlock circuit The car's owner may desire to lock or unlock the car's door via some remote switch or push-button without arming or disarming the alarm. The present invention provides for this feature with an external switch circuit. A "LO" signal from some remote switch or push-button passes through the external switch circuit consisting of R61 and IC61. If the car's ignition key is off and the doors closed, the alarm will start to arm and the car's doors will start to lock via the exit delay circuit as shown in section B above. At the same time, IC61 transmits a "HI" directly to input C of IC11. Note that in this case said signal does not pass the said exit delay circuit, meaning that the doors will lock or unlock immediately upon command of the car's owner. On the other hand, if the car's ignition key is on or one of the car's doors is opened when said remote switch is used, output Q-bar of IC22 will remain "HI," so the exit delay is not started. But the "HI" from IC61 is still transmitted directly to input C of IC11.

If output Q of IC11 is "LO" and output Q-bar of IC11 is "HI," then the car's doors will lock as demonstrated in section A above. At the same time, output Q and Q-bar of IC11 will both reverse states to indicate that the present invention's last operation was to lock the doors. On the other hand, if output Q-bar of IC11 is "LO" and output Q of IC11 is "HI," then the car's doors will unlock as demonstrated in section A above. At the same time, output Q and Q-bar of IC11 will both reverse states to indicate that the present invention's last operation was to unlock the doors.

What is claimed:

1. A device for controlling power door locks of an automobile protected by an automotive burglar alarm, comprising:

an external switch circuit for generating a control signal for (a) manually arming and disarming said automotive burglar alarm and for (b) manually locking and unlocking said power door locks;

a switch control circuit for receiving an arm or disarm signal from said automotive burglar alarm and for receiving said control signal from said external switch circuit and, in response thereto, selectively generating lock and unlock control signals to respectively lock and unlock said power door locks;

a door unlock circuit for generating a door lock signal for locking the power door locks in response to said lock signal from said switch control circuit;

a door unlock circuit for generating a door unlock signal for unlocking said power door locks in response to said unlock control signal from said switch control circuit;

whereby said power door locks are automatically locked when said burglar alarm is armed and unlocked when said burglar alarm is disarmed.

2. A device for controlling the power locks of an automobile as claimed in claim 1, including means for inhibiting the switch control circuit from receiving said signal from said automotive burglar alarm and said control signal from said external switch circuit during a predetermined period of time during which the power door locks are in the process of locking or unlocking.

3. A device for controlling the power door locks of an automobile a claimed in claim 1, wherein the door lock circuit includes a timer circuit which can be programmed to adjust a duration of said lock signal.

4. A device for controlling the power door locks of an automobile as claimed in claim 1, wherein the door unlock circuit includes a timer circuit which can be programmed to adjust a duration of said unlock signal.

5. A device for controlling the power door locks of an automobile as claimed in claim 1, further including a door monitor circuit for detecting an open condition of a door of said automobile and inhibiting locking of said power door locks upon detecting an open condition of said door and for automatically generating said lock signal in response to said door remaining closed for a predetermined time period after said unlock signal is generated by said switch control circuit thereby relocking said power door locks if said door is not opened subsequent to an unlocking operation.

* * * * *